United States Patent [19]
Cattanach et al.

[11] Patent Number: 5,735,147
[45] Date of Patent: Apr. 7, 1998

[54] SYSTEM FOR PREVENTING THE MOVEMENT OF VEHICLES HAVING AIR BRAKES

[76] Inventors: John T. Cattanach, 1238 N. Cedar Ridge Dr., Duncanville, Tex. 75116; Roy L. Chandler, 1814 Dogwood Dr., Arlington, Tex. 76012

[21] Appl. No.: 772,976

[22] Filed: Dec. 23, 1996

Related U.S. Application Data

[63] Continuation of Ser. No. 323,364, Oct. 14, 1994, abandoned, which is a continuation-in-part of Ser. No. 47,528, Apr. 15, 1993, abandoned.

[51] Int. Cl.$^6$ ..................................................... F16K 35/06
[52] U.S. Cl. ............................... 70/164; 70/177; 70/178; 70/416; 70/417; 137/382
[58] Field of Search ........................ 70/417, 175–180, 70/163, 164, 416, 228, 242, 243, 244, 170, 171; 137/382, 377

[56] References Cited

U.S. PATENT DOCUMENTS

| 206,228 | 7/1878 | Connolly | 70/164 X |
|---|---|---|---|
| 881,031 | 3/1908 | Schultz | 70/417 |
| 1,380,346 | 6/1921 | Bernardini | 70/242 |
| 1,690,461 | 11/1928 | Sieben | 70/178 X |
| 1,817,802 | 8/1931 | Cooper | 70/178 |
| 2,377,036 | 5/1945 | Quarfoot | 70/178 |
| 3,572,062 | 3/1971 | Beebe | 70/1.5 |
| 3,672,190 | 6/1972 | Palazzolo | 70/232 X |
| 3,745,797 | 7/1973 | Pavek | 70/232 |
| 3,844,144 | 10/1974 | Schmitt | 70/417 X |
| 4,041,741 | 8/1977 | Cintron | 70/417 |
| 4,163,584 | 8/1979 | Koenig | 303/7 |
| 4,302,057 | 11/1981 | Durling | 303/7 |
| 4,466,264 | 8/1984 | del Nero | 70/417 |
| 4,503,692 | 3/1985 | Grint | 70/417 X |
| 4,681,134 | 7/1987 | Paris, Jr. | 70/177 X |
| 4,779,433 | 10/1988 | Légaré | 70/177 X |
| 4,881,388 | 11/1989 | Pruim | 70/175 |
| 4,888,968 | 12/1989 | Azvedo | 70/163 |
| 4,906,150 | 3/1990 | Bennett | 411/119 |
| 4,913,254 | 4/1990 | Castro et al. | 70/163 X |
| 5,172,574 | 12/1992 | Perfetto | 70/56 |
| 5,375,916 | 12/1994 | Cook | 70/177 X |
| 5,560,233 | 10/1996 | Watkins | 70/180 X |

FOREIGN PATENT DOCUMENTS

| 365320 | 1/1932 | United Kingdom | 70/416 |
|---|---|---|---|
| 619653 | 3/1949 | United Kingdom | 70/416 |
| 2153002 | 8/1985 | United Kingdom | 70/58 |

*Primary Examiner*—Lloyd A. Gall
*Attorney, Agent, or Firm*—Charles W. McHugh

[57] ABSTRACT

An apparatus is adapted to prevent the theft of a wheeled vehicle having air brakes (e.g., large trucks and buses). A brake valve is selectively actuated by linear movement of an exposed knob that is located adjacent a supporting structure in the cab, and a valve housing is mounted behind the supporting structure. A new structural base is permanently connected to the valve housing in an exposed position in the vehicle's cab. The base is normally accessible to the driver at all times, but it is thin enough so that it will not interfere with normal push/pull movement of the valve's knob. A rigid and generally hollow cover is adapted to be selectively suspended over and in contact with the structural base. The cover is sufficiently deep as to envelop the valve's knob in order to conceal it and render it inaccessible when the cover is suspended over the base. The cover is selectively removable from the base so as to permit the driver to remove the cover and thereby have access to the knob. A locking device is provided for selectively locking the rigid cover in its suspended position over the structural base. In the preferred embodiment the cover is made of a double-wall box that is heat treated to resist tampering. The cover does not contact the valve stem or the knob, so any hammer blows on the cover by a thief will not be transferred to either the stem or the knob.

23 Claims, 7 Drawing Sheets

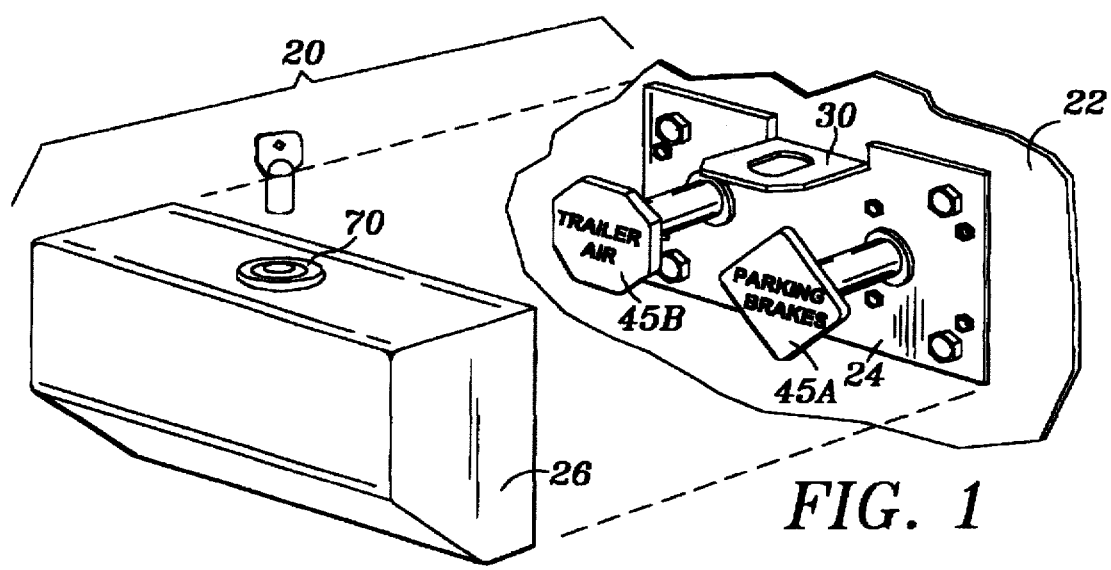
FIG. 1
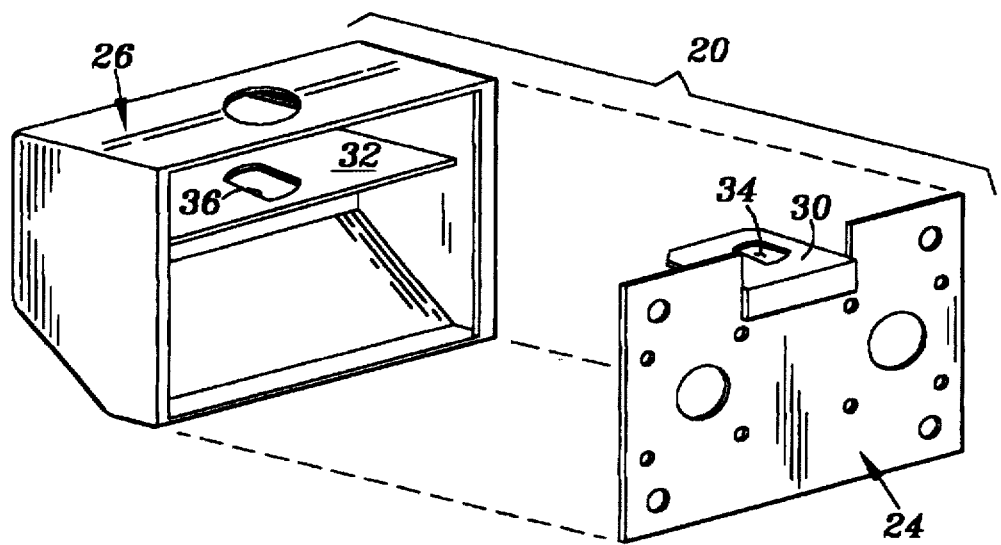
FIG. 2
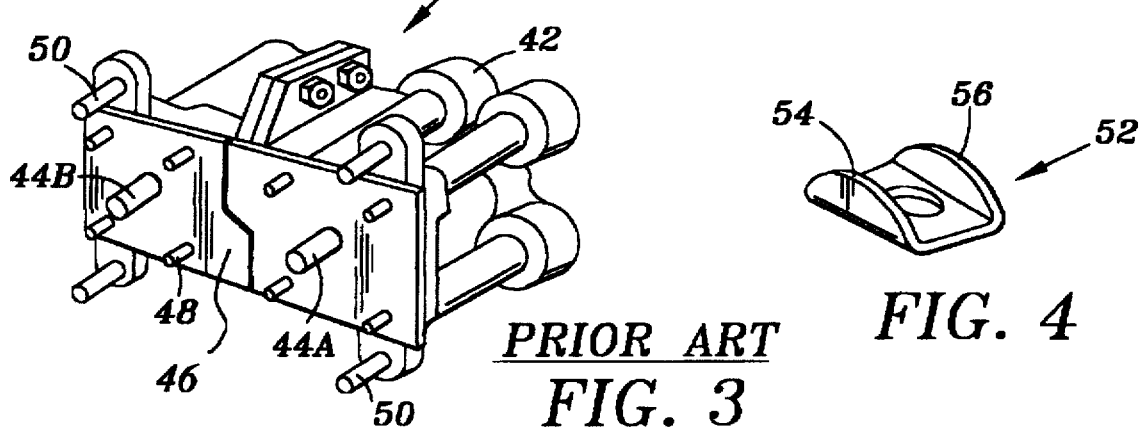
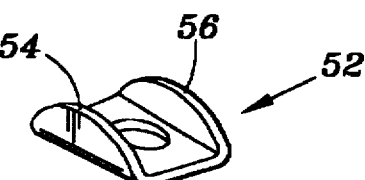
PRIOR ART
FIG. 3
FIG. 4

SYSTEM FOR PREVENTING THE MOVEMENT OF VEHICLES HAVING AIR BRAKES

This is a continuation of application Ser. No. 08/323,364, filed Oct. 14, 1994, now abandoned, which was a continuation-in-part of application Ser. No. 08/047,528 filed Apr. 15, 1993, now abandoned.

BACKGROUND OF THE INVENTION

This invention relates to security systems that are adapted to prevent the unauthorized movement of large trucks, buses, tractors and similar vehicles that utilize pressurized air to control the vehicle's brakes; more particularly, the invention relates to a tamper-proof box that is adapted to be selectively secured over the knob(s) that is (are) used to release the vehicle's brakes, said brakes being effective—until they are released—to hold a parked vehicle against movement.

For convenience, the description that follows will usually refer to tractors and their associated trailers; but it should be kept in mind that any vehicle that has air brakes can utilize the same assembly that will be described herein.

It is unfortunate but true that there are too many instances in which thieves, seemingly with relative ease, succeed in stealing buses, large trucks and the tractors that are used to pull large trailers along our public highways. Most of the time a thief will take not only the tractor but also the trailer that is attached to it, including what may be a very valuable cargo. No doubt one reason that tractor/trailer combinations are often stolen is that they are frequently parked and left alone at restaurants, truck stops and motels—with the tractor's engine running. An engine is commonly left running in the summer to provide air-conditioned (i.e., cool) air to the interior of the tractor's cab. In the winter, an engine will commonly be left running in order to keep both the engine and cab warm, and to prevent the tractor's Diesel fuel from turning into a useless gel—which usually happens when the fuel gets below 10° F. And with the tractor's engine running, all a thief needs to do is break out a side window, unlock the cab's door, climb into the cab, push on a knob to apply pressurized air to the brakes (to release them), and then drive away on an adjacent highway.

The knob that releases the brakes will usually be of the type shown in U.S. Pat. No. 4,163,584 to Koenig entitled "Fluid Pressure Braking System" (assigned to The Bendix Corporation), or U.S. Pat. No. 4,302,057 to Durling entitled "Pneumatic Control Valve" (assigned to Midland-Ross Corporation). And while such knobs do not actually constitute an operative part of this invention, it should soon become apparent in the description that follows that the protection of such knobs (and their associated valves) is the important thing in preventing the theft of trucks, trailers, tractors, etc. For completeness, then, the teachings of the Koenig and Durling patents can provide valuable background information concerning the present invention.

Perhaps it should be acknowledged here that the incidence of theft of tractors and trucks with air brakes is not really a new problem; and there have been proposals frown time to time to provide security devices for such vehicles. For example, one such locking device is a generally T-shaped metal structure that is inserted into the U-joint that extends between the vehicle's transmission and the driven wheels. However, repeatedly installing and removing such a locking device is not always quick or easy, because it involves reaching over or around the vehicle's wheels in order to reach the centrally located drive shaft and its U-joints; and both installation and removal of the device can result in getting grease and mud on the driver's hands and clothing. Such a locking device can be especially awkward to install—for drivers who are not tall and who don't have long arms.

Other drivers have sometimes resorted to wrapping a large chain around both the steering wheel and something rigid in the vehicle's cab that is capable of serving as an anchor, e.g., the structural arm that supports the brake pedal. But such chains may become dirty and they are always a bit awkward to handle. Too, bolt cutters can be used to cut many chains and/or the padlocks that supposedly secure them; and even heavy logging chains can be cut by a determined thief and a cutting torch. So given both opportunity and some time, a thief can usually get around even the finest chains that money can buy.

Because of the boldness with which some thieves have been known to operate, many drivers have been inconvenienced, even if they haven't been directly involved in a case of truck theft. For example, one mid-Western city in the United States has been the situs for so many over-night thefts of automobile haulers that the drivers who are delivering new automobiles to local dealerships have standing orders to drive their rigs 100 miles out of the city to spend the night—if they are unable to unload all of the automobiles before the dealership closes for the night. Of course, it should be understood that the combination of a tractor, a car hauler and a full load of new cars can constitute as much as a quarter of a million dollar's worth of rolling assets. So for a driver to travel a total of 200 miles in order to obtain security for such assets may seem to be a prudent thing to do, at least in the eyes of a fleet manager and/or the insurance agent that is insuring those assets. But even an unsophisticated layman should be able to see the waste in time, fuel and wear/tear that is involved in driving trucks and tractors 100 miles out of town to obtain security against theft, rather than providing the kind of security that will render those trucks and tractors dependably immobile. It is an object of this invention to provide a security device that can protect individual vehicles against being moved, thereby minimizing the need to take unusual actions to store the vehicles in theft-proof areas.

Another object is to foster the safety of the general population, by reducing the opportunity for so-called "joyriders" to steal a large truck and then simply drive it around for a few hours. Strange as it may seem, there apparently are at least a few thrill-seekers who get some pleasure out of the illicit operation of a large truck; and an inordinate consumption of alcohol apparently does not even have to be a contributing factor in leading to such incidents. And those who would steal and drive an 18-wheeler just for the fun of it cannot be expected to be the kind of responsible and safe drivers that we expect professional drivers to be. So anything that can prevent the unauthorized driving of large vehicles on public roads can be expected to make life safer and quieter for everyone.

A further object is to provide a security system that would foster dependable but unobtrusive control in the movement of tractors and their trailers in a distribution yard or the like, such that some persons might have "master" keys that will permit all vehicles to be moved, while other persons have keys that permit only a limited category of vehicles to be moved. For example, a foreman or mechanic might have a "master" key that would permit the brakes to be released on all vehicles in the fleet, while a trainee could be given custody of a key that will release the brakes of only the specific vehicle that has been assigned for the trainee's use. A master key may also be used to "over-ride" the locking of a given lock, so that even the person who originally secured the lock cannot move a truck until the master key has been utilized to free it. One use for such an over-ride function may be for a dispatcher (who has the master key) to secure a truck and thereby deliver a very positive message to the assigned driver, the message being somewhat to the effect of "Don't leave until I've had a chance to talk with you."

Another thing to be taken into consideration when trying to design a security system for vehicles with air brakes is that neither the vehicle's manufacturer nor the vehicle's owner has the discretion to design and/or utilize anything that would "invade" the sanctity of the air brake system. Nor can anyone go into a vehicle's cab and interfere with the standardized shape, size, color, arrangement and labeling that is present on the knobs that are used by a driver to move the valve stems in and out with respect to the housing of the brake valve. That is, the U.S. government (acting through the Department of Transportation) has taken full responsibility for the design and safety of the mechanical parts of large vehicles that travel U.S. highways, and there are prohibitions against doing anything that would alter the air brake system of a large vehicle. So once the Department of Transportation (commonly abbreviated DOT) has sanctioned the design of a particular system, including all parts thereof (such as brake valves and their operating knobs), there is nothing that an owner/driver can do to alter that part. It follows, therefore, that concepts like the one shown in U.S. Pat. No. 4,881,388 to Pruim entitled "Lock For A Brake Valve" are interesting to look at, but they have no realistic value—unless and until the DOT has tested and certified the new design as being safe and eligible for installation on tractors, trucks and buses, etc. So even though a Pruim lock might provide more security for a rig, it would involve the elimination of a convenional knob and the substitution of an outer shell or sleeve (along with a lock); and the DOTs charter involves complete and absolute concern for vehicle safety—but essentially zero concern for vehicle security. It is therefore an object of this invention to teach a security system that can help protect a rig against theft, and which has real practical value because it does not alter any existing parts of a braking system (including the control knobs, etc.) that the DOT has designated as sacred and therefore untouchable.

Still another object is to provide an economical security system for precluding the unauthorized movement of a parked vehicle with air brakes—and which is "armored" or "hardened" to preclude tampering with the structural parts of the security system.

One more object is to provide a locking system for vehicles with air brakes that permits personalization of the system by permitting an individual's personal lock to be moved from vehicle to vehicle and installed in a common structural receptacle.

A further object is to teach a security system that can be added to existing trucks and tractors without requiring any alteration of the pneumatic parts of those systems, whereby there is no need to have newly protected systems reinspected before the vehicles are put back on the road.

These and other objects will be apparent to a reader who carefully studies this specification and the concluding claims, with appropriate reference to the several figures of the drawing that are attached hereto.

BRIEF DESCRIPTION OF THE FIGURES OF THE DRAWING

FIG. 1 is a perspective view of one embodiment of the invention, with the two major sub-assemblies being shown separated—as they would appear before they are brought together in the cab of a vehicle that has air brakes;

FIG. 2 is a perspective view of the two major sub-assemblies of FIG. 1 but taken from a different angle, with the sub-assemblies again being shown separated in order to better provide a clue as to how they are eventually brought together;

FIG. 3 is a perspective view of the housing of a typical air valve that is mounted in the cab of a tractor, said valve being used to effect the application or removal of pressurized air to control the tractor's conventional brakes;

FIG. 4 is a perspective view of a U-shaped clip that helps isolate the nut part of a threaded fastener that is present on the back of a valve housing, said clip helping to hold an associated nut whose function is to secure a base plate to a valve housing;

BRIEF DESCRIPTION OF THE INVENTION

Figure 5:
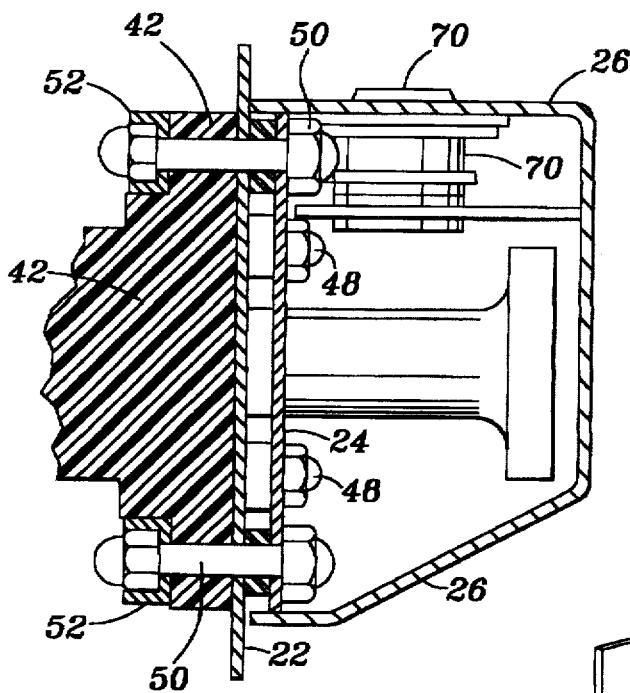
FIG. 5 is a fragmentary side elevational view of the housing of the air valve shown in FIG. 3, and further showing a typical installation of the base plate of this invention, with the valve housing being mounted behind a supporting structure (such as an instrument console) and a control knob being mounted in front of the supporting structure.

The invention includes an apparatus that is adapted for installation on a wheeled vehicle of the type that uses air pressure to control its brakes. Such vehicles typically have a cab in which a driver sits to operate the vehicle, and there is at least one manually actuated valve that the driver uses to control the vehicle's brakes when the vehicle is parked. (The term "cab" is used herein in a very general and loose manner, and is only intended to refer to the region where an operator sits to control a vehicle. In this general sense, even a bus may be said to have a cab.) As manufactured, the brakes have very strong springs that continuously urge the brake pads to an engaged (or "ON") condition. In order to move such a vehicle, two things must happen: 1) there must be a supply of pressurized air in excess of 60 pounds per square inch, which is routinely obtained from an on-board compressor operated by a vehicle's engine; and 2) the pressurized air must be supplied to the vehicle's brake system, to compress the springs and thereby release the brakes. As long as pressurized air has not been admitted to the brakes, the vehicle will be the equivalent of many thousands of pounds of dead weight. In a typical vehicle, the air valve that releases the brakes is located in the vehicle's cab; but the valve is not visible to the driver or others because it is located behind a supporting structure (e.g., a console) that essentially constitutes a cosmetic feature of a modern cab.

Protruding from the front of the air valve is at least one shaft that passes through the supporting structure; and attached to the distal end of the shaft is a knob that is configured for push/pull operation by the driver. Actuation of the valve is effected by a short longitudinal movement (usually about one-fourth inch) of the knob. Such an arrangement is shown in U.S. Pat. No. 4,302,057 to During entitled "Pneumatic Control Valve," whose teachings with regard to air brakes and applicable portions of Federal Motor Vehicle Safety Standard No.121 should be deemed to be incorporated herein for all purposes. When air is used to regulate both the brakes of a tractor and a trailer, there will be two shafts and two knobs; one knob and its associated shaft are pushed to release the tractor's brakes, and the other knob and its shaft are pushed to release the trailer's brakes.

The typical supporting structure in the cab is often made of molded plastic having a thickness of only about ⅛ inch; and it will often be noted more for its cosmetic appearance than for its strength. Of course, this lack of structural rigidity in the past was really of little importance, because there had been nothing that was very heavy or structurally critical that was mounted on the supporting structure. So the first thing that is done in accordance with this invention is to reinforce or "harden" the region around the exposed knob that can release the vehicle's brakes. This is done by providing a rigid base that is securely anchored to the housing of the air valve. To mate with the valve housings that are already on the market, a specially configured planar member is provided, said member having a plurality of apertures that can be aligned with most—and preferably all—of the holes that are provided by the manufacturers of such valves. There are usually a dozen of such holes, some of which already have threaded bores (which can be used without modification), and others which may require the addition of a metallic insert or lock nut, etc., to accept a secure fastener. Often several of the holes have already been filled with bolts by the valve manufacturer, so a truck manufacturer doesn't even have to furnish bolts in order to install a valve on a tractor. Spatially, the rigid base is placed in front of the air valve's housing, adjacent the supporting structure and directly behind the exposed knob.

Next, a rigid cover is sized and shaped so that it may be selectively suspended over the structural base after the base has been mounted in the vehicle's cab. The cover is sufficiently deep as to envelop the protruding knob of the air valve, in order to render the knob inaccessible when the rigid cover is suspended over the base. A cover having a depth (from front to rear) of about 2.25 inches and a volume of about 45 cubic inches will usually be about right for a typical two-stem valve. Naturally, the cover must be selectively removable from the base in order to permit the driver to push on the knob and thereby operate the air valve in a normal manner. To prevent the unauthorized removal of the cover, there is provided a locking means for holding the rigid cover in its suspended position over the base.

In the preferred embodiment, the locking means includes a pair of juxtaposed apertures in two structurally solid pieces; one of these pieces is connected to the base and hence may be considered to be static, and the other piece is connected to the removable cover. When these two structurally solid pieces have been brought into suitable alignment, a locking device is inserted into the juxtaposed apertures. In accordance with the preferred embodiment of the invention, the locking device is selectively removable from the rigid cover by a person having an appropriate key. And when the locking device has been removed, the cover may be temporarily pulled away from the base; this again exposes the knob and allows it to be pushed in a normal manner in order to introduce pressurized air to the braking system. The vehicle can then be driven. For convenience, the cover may be placed back over the base, and this position may now be thought of as a storage position. The locking device may be stored by placing it onto the cover; or, the locking device (which is relatively small and weighs about 3 ounces) may simply be dropped into the pocket of a driver's shirt or jacket—until it is again needed for securing the vehicle against movement.

DETAILED DESCRIPTION OF ONE EMBODIMENT OF THE INVENTION

Referring initially to FIGS. 1, 2, and 3, a security apparatus 20 is shown as it would typically appear on the dash board or similar supporting structure 22 in the cab of a vehicle having air brakes. (A conventional vehicle and its cab need not be significantly modified in order to practice this invention, so it will not be necessary to introduce any confusion to the drawing by adding unnecessary details of the vehicle, etc.) The apparatus 20 includes two major pieces or sub-assemblies that are unique to this invention: a rigid base 24 that is connected to the housing of the vehicle's air valve to provide a structural foundation where it does not already exist; and a strong cover 26 that is selectively positionable adjacent, and connected to, the base. In the preferred embodiment, the rigid base 24 is generally planar and is permanently affixed to the valve housing. Of course, the term "permanent" will be understood by mechanics to be a relative term, and that is the sense in which it is being used herein. (Given enough time and the right tools and an incentive to do so, a good mechanic can probably disassemble and then put back together most any mechanical device that's not broken.) Additionally, some kind of a locking means must be provided for precluding the removal of the cover from the base except by authorized persons.

One part of the locking means may be a commercially available lock 70, such as a Series 7500 tubular keyed lock that is available from Baton Lock Company of Garden Grove, Calif. Such a locking device has substantial strength against shear in its mid-region; so the apparatus 20 has been designed to take maximum advantage of this strength. The preferred lock in this series is the 7522-00 lock; it is promoted by the manufacturer as an ideal lock for operators of self-storage facilities that collect rental payments from individuals on a monthly basis, etc. Those skilled in the art will recognize that the use described herein constitutes a different use for an old device. As used in this apparatus 20, two closely spaced structural pieces 30, 32 are provided with apertures 34, 36 that can be manually brought into juxtaposition; and the locking device 70 is sized to pass through and be held snugly in the two apertures. When the locking device is installed, it will prevent any relative movement between the two structural pieces 30, 32. In the preferred manner of securing a cover to a base plate, the lock 70 is removable so that it may be dropped in a driver's pocket when it is not in use—for greater security.

To better appreciate how a security apparatus 20 can be installed on a vehicle that uses pressurized air to control its brakes, it will be useful to refer to a typical air valve 40 as it comes from a supplier (shown in FIG. 3). The valve 40 has a rigid housing 42, often made of a molded plastic material, with a pair of shafts 44A, 44B that extend out of the housing front 46. Knobs 45A, 45B are affixed to the distal ends of these two shafts, to facilitate the push/pull motion of the shafts—to effect brake operation. The illustrated valve 40 is of the type that is commonly installed on a tractor that is used to pull a large trailer, the combination sometimes being referred to as a 18-wheel tractor/trailer "rig." One of the two shafts 44A, 44B operates the valve to set and release the brakes on the tractor, and the other shaft is used to set and release the brakes on the trailer. Large trucks and buses that are never expected to pull a trailer will typically have a similar valve housing—but there will only be a single protruding shaft instead of two. The valve housing 42 has a plurality of bores and/or apertures that are aligned so as to be generally parallel with the longitudinal axes of the shafts 44A, 44B; these bores/apertures are routinely filled with bolts, studs or other threaded fasteners that are used to mount the housing in a stable manner in the vehicle's cab. When the housing 42 is made of plastic, some of these bores and/or apertures are supplied with metallic inserts having internal threads that can be engaged by conventional screws or bolts for attaching the housing to the back side of the supporting structure 22. As shown, there are eight small bores distributed across the front face 46; and these bores are filled (by the original manufacturer of the valve) with metallic studs or bolts 48. There are also four large bores distributed around the periphery of the housing 42; four bolts 50 are inserted in these peripheral bores.

If desired, and if the configuration of the housing 42 permits, some or all of the original screws for holding the housing 42 in place (behind the back of the supporting structure 22) may be discarded. In their place there may be provided high-strength, heat-treated metal fasteners (i.e., screws or bolts). Once installed, such fasteners cannot be removed by persons who do not have access to the front of the base 24, and who do not have in their possession whatever wrench or other tool may be required. But it should be remembered that the entire concept of this invention rests upon securing a high-strength cover over the brake-release knob and anything adjacent to it—including any nuts or other fastening devices that hold a base 24 securely to the front of a valve housing 42. So if the cover 26 is properly locked in place over an installed base 24, there is no way that any person can gain access to the fasteners to remove them.

The permanence of the four peripheral fasteners 50 (once installed) can be enhanced by placing non-turn, structural tabs underneath any nuts that are on the back side of the housing 42. Exemplary structural tabs 52 are shown in FIG. 4. In cross section the tabs 52 have a generally "U" shape, with two upturned sides 54, 56 that are spaced far enough apart to accept a nut that is oriented with its flats next to the inside walls. The interior spacing between the sides 54, 56 is not so great as to permit a captured nut to rotate. And the height of the sides 54, 56 is such as to prevent a person from placing a wrench on a captured nut. Hence, the only way to remove a fastener 50 and any nut on the back side of the housing 42 is to have access to the front side of the housing; and access to the front side is controlled by controlling the cover 26. It could even be said that, in accordance with this invention, he who controls the cover 26 can control movement of the truck and its associated trailer (if any).

Turning next to FIG. 5, a fragmentary part of an exemplary valve housing 42 is shown, with small fasteners 48 and large fasteners 50 protruding out of the front face of the housing. Usually there are eight small fasteners and four large fasteners. Also shown in this figure is a fragmentary segment of the generally planar supporting structure 22 which is captured or "sandwiched" between the front of the valve housing 46 and the new structural base 24. If the original mounting process for the valve housing 42 did not utilize twelve fasteners, then some new holes may need to be drilled in the supporting structure 22. The object, of course, is to permit the passage of as many bolts or other fasteners as feasible—from the valve housing 42 to the base 24. The drilling of a few small holes through a relatively thin piece of plastic structure 22 does not constitute a major modification of the truck's cab. And if a person should someday want to transfer a security system from an old truck to a new one, a small amount of carpenter's putty can be used to return the original support structure 22 to a neatly repaired condition.

Another significant feature about the invention being disclosed herein is that there does not have to be any modification to the valve's housing or the valve's manner of operation in order to realize the security that is desired. This is an important consideration when it is remembered that the safe operation of a tractor's brakes are of concern to not only the driver of a given vehicle but also to the public in general. And if the use of this security system required any alteration of the brake valve or its operation, then the safety of a modified valve would have to be extensively tested by the U.S. Department of Transportation and the vehicle re-certified for highway operation. Too, there are truck owners and insurers who would have some concern about potential liability if a tractor's brakes should fail; people who are responsible for such things would want to be assured that a modified valve meets very strict operational and safety standards. Therefore, it is significant that the anti-theft benefits described herein can be achieved without tying into a brake's sealed system, substituting any operational parts, or in any way affecting the brake's operation. Nor would a truck manufacturer be required to order any special valves in order to take advantage of the security being offered by this apparatus. So the security apparatus 20 could be used as an "aftermarket" device on the hundreds of thousands of existing trucks that are already on the road, as well as any new trucks that are currently being manufactured.

In this regard, the invention disclosed herein is different from, and a significant improvement over, the "Lock For A Brake Valve" shown in U.S. Pat. No. 4,881,388 to Pruim dated Nov. 21, 1989. For its operation, the Pruim lock requires the combination of a special valve stem, a matching valve housing, and a cylindrical locking apparatus using tubular casings, pins, springs, etc. This would mean that new valves being manufactured today as original equipment for trucks could be built in accordance with the Pruim design; they could then be installed by truck manufacturers as original equipment. But there would be no way of utilizing a Pruim lock on the hundreds of thousands of trucks, tractors and trailers that are already in use—without a major installation job that involves discarding the original valves and replacing them with new valves having the special stems shown in the Pruim patent, etc.

Figure 6A:
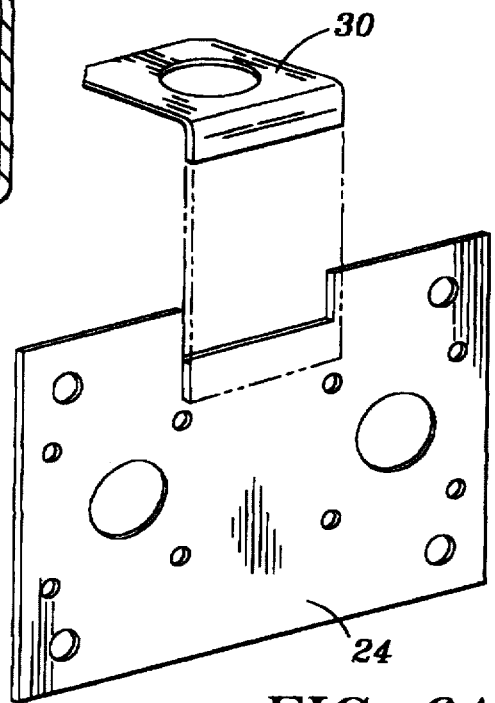
FIG. 6A is a rear perspective view of a rigid base to which a cover may be subsequently attached in order to render the control knob inaccessible, with the two parts of the base being shown in a separated condition—before they are brought together.
Figure 7:
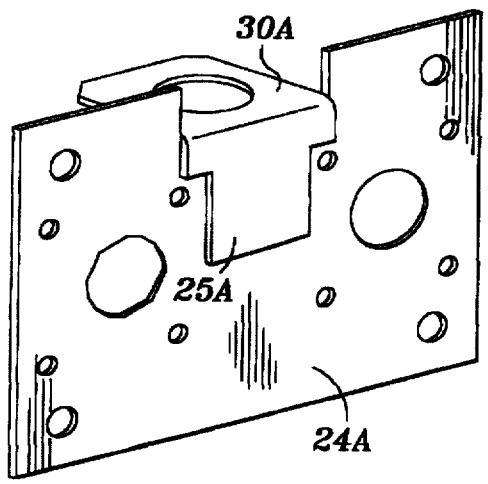
FIG. 7 is a perspective view of another embodiment of a base plate, wherein the tongue piece is physically held in position adjacent the back of the vertical piece but is not welded thereto.
Figure 6B:
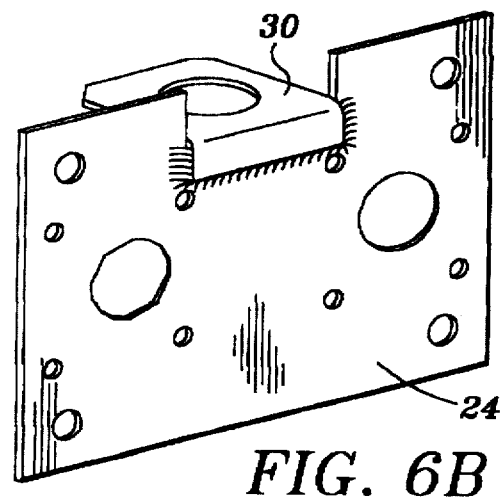
FIG. 6B is a rear perspective view of the rigid base shown in FIG. 6A, with the two parts of this particular embodiment being shown in an assembled (i.e., permanently welded) condition.

Referring next to FIGS. 6A and 6B, the base plate 24 is shown in its disassembled condition. Preferably, the two parts are stamped from 4130 alloy steel (hot rolled and in the normalized condition), about 0.090 inch in thickness; after the parts are formed, they are then welded together (FIG. 6B) and heat-treated to a hardness of at least Rockwell C55. Other high carbon or alloy steels that will give similar hardness and toughness would also be serviceable. A nitriding treatment may also be useful to increase the resistance of the base plate 24 to any potential abuse that a thief might give it, in case the thief encountered the assembly 20 for the first time and was not yet aware that it is too tough to be defeated with ordinary tricks of the burglary trade. Alternatively, the anchor part of a tongue piece 25A may be made somewhat longer, as shown in FIG. 7, and simply slipped into a prepared recess behind the planar base 24A when the cover 26 is to be installed. Because of its spatial relationship to, and the strength of, the metal base 24A, a tongue piece 25A with a long "tail" need not even be welded to its associated vertical piece.

Figures 8, 9A, 9B, 9C, 9D:
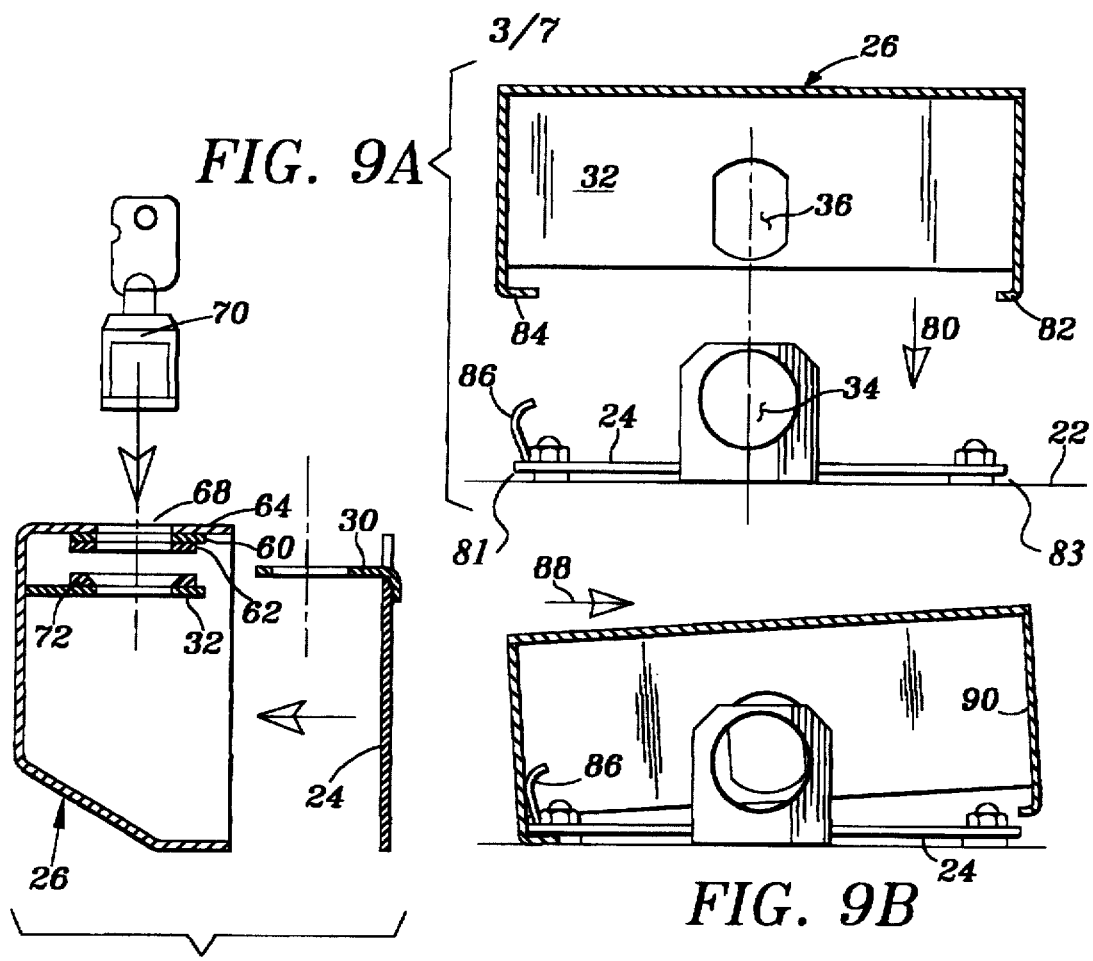
FIG. 8 is a side elevational view, partially cross-sectioned and exploded, showing the three major parts of the security system as they would appear before being brought together in a vehicle.
FIGS. 9A through 9D show the process that a truck driver would routinely go through in order to mount a cover over a mounted base plate in the vehicle's cab, wherein a pair of inwardly directed lips or flanges on the cover are brought into engagement with a pair of outwardly opening recesses alongside the base plate.

In FIG. 8, the major parts of a three-part security system 20 are shown in the relative position that they will occupy when they are subsequently brought together into an operative position. In this view, it will be seen that the top of the cover 26 has been reinforced with two washer-like members, namely, a metal spacer 60 and a metal "lock stop" 62, both of which are fixed to the cover top 64 by welding or the like. Both the spacer 60 and the lock stop 62 may be advantageously made out of the same material as the base plate 24 and cover 26, e.g., a high-carbon steel that can be tempered.

Figure 10:
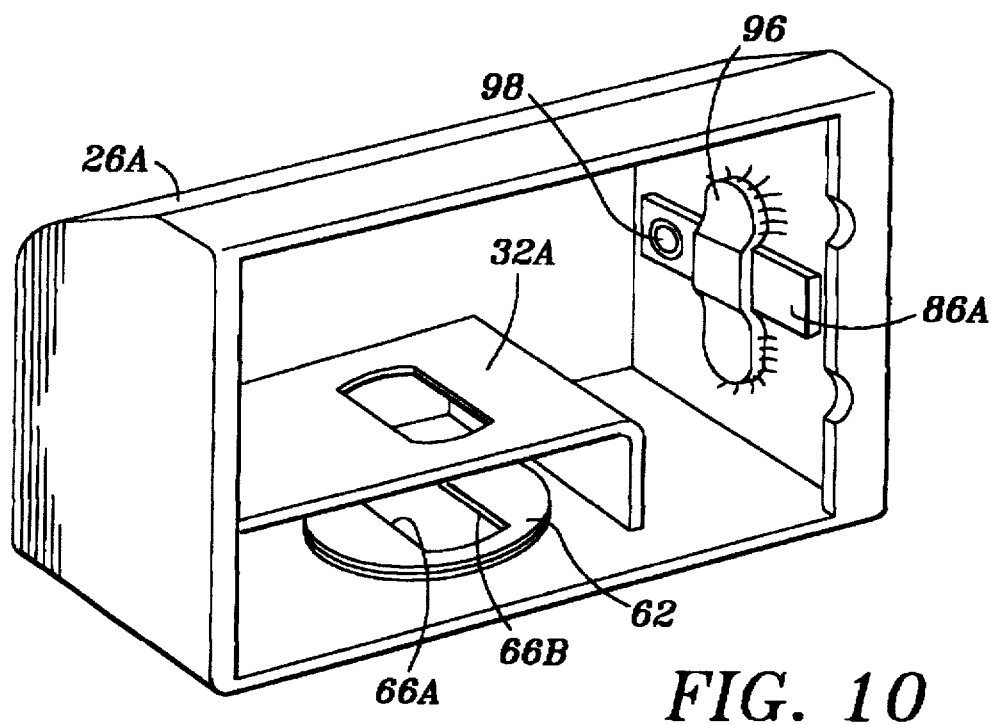
FIG. 10 is a perspective view of an alternate embodiment of a cover, in which a leaf spring that keeps the cover centered with respect to the base is carried by the cover instead of being mounted on the base.

The lock stop 62 has two flat sides 66A, 66B that are more readily visible in FIG. 10. As might be suspected from the name given to it, the lock stop 62 allows the barrel of the "double D" locking device 70 to pass downwardly through an opening 68 in the top of the cover, but it prevents the locking device from going too far. Hence, piece 62 serves as a positioning device, i.e., a mechanical "stop." By the judicious placement of the lock stop 62 during the manufacture of the cover 26, the locking device 70 will come to rest at a level that is low enough such that its top will appear to be in a kind of shallow recess in the top of the cover. The sides of the locking device (which will normally be segments of a cylinder) will be below the top surface of cover top 64. This positioning helps ensure that a chisel or similar prying tool cannot be used by a thief to get a "bite" on an installed locking device.

Also visible in this particular view is a thin, washer-shaped guide 72 that is placed on an upper surface of the structural piece 32. The guide 72 is preferably made of a low-friction plastic material, and it has an inwardly slanted taper that helps guide the barrel or shank of the locking device 70 as it is descending into the cover 26 to a position where it can be locked. A plastic guide 72 is beneficial when there is a goal of maintaining very tight tolerances for the parts that move with respect to one another as they are brought into engagement. But if tight tolerances are not a major concern in designing and sizing an assembly 20, then a plastic guide 72 will likely be superfluous.

Turning once again to FIG. 5, the three major parts have been brought together and placed into a position on the front of the valve housing 42 where they offer protection against unauthorized movement of a valve stem. The cover 26 will be supported—vertically—by virtue of the fact that the base plate 24 just fits within the vertical gap between the cover's top and bottom. After the locking device 70 has been inserted (as shown), the cover 26 will be precluded from any movement: right or left, in or out, or up and down. Of course, the welded sides of the cover have been omitted in this view, in order that the reader might better see the internal parts of the apparatus and how they are spatially related when they are engaged.

In FIG. 5 the key has been removed from the position where it would be manually used to lock or unlock the locking device—by turning a latch plate ninety degrees. Of course, to provide any actual security for a truck and its cargo, the key has to be removed from the locking device 70. Later, when the truck is parked in a location that is sure to be safe against theft, both the key and the locking device may simply be lifted from the apparatus 20 and dropped into a driver's pocket. By completely removing the locking device 70 from the apparatus 20, there is less opportunity for someone to try to identify the locking device by serial number or the like—and perhaps surreptitiously obtain a duplicate key. Another advantage of being able to completely remove the locking device 70 from the structural part of the security assembly is that another driver can be assigned the task of driving a particular truck without having to share custody of a key. The new driver merely inserts his or her own locking device into the juxtaposed apertures 34, 36, and the new driver will have as much security on the road as the first driver had. The security of the original driver's key and lock is protected, of course, because they never leave the driver's possession. Furthermore, if a driver ever quits, the employer need not have any concern that the driver might have once made a duplicate key—and then might be tempted to use that duplicate key in furtherance of some illegal activity. If and when any driver quits his job, absolute security for a tractor is achieved by simply issuing a fresh lock (with its unique key) to a new driver. A Baton Series 7522-00 STORAGEMASTER lock can be obtained with any one of about 600,000 different key codes, so there is little risk that a stranger will have a key that might open a particular lock. Hence, there is no need for an employer to place a hurried call to a locksmith to change out one or more locks, or to issue new keys to other employees, etc.

Having now described the general nature of various structural parts, attention will now be turned to a particularly efficacious manner of installing a cover 26 over a base plate 24, with the installation being made easy because of the design of the "open" rear face of the cover 26. Referring still to FIGS. 5 and 8, but giving additional attention to FIG. 9A, it should now be appreciated that the installation of a cover 26 includes initial movement of the cover 26 toward an already installed base 24, in the direction of the arrow 80. But a very careful examination of the relative sizes of the two parts 24, 26 will reveal that the opening between lips 82, 84 on cover 26 are closer together than the outer edges of base 24. In one example, the opening between lips 82, 84 is 5.188 inches, while the length of the base plate 24 is 5.500 inches. This relative sizing means that it will be impossible to move the cover 26 (in the direction of arrow 80) straight onto base 24. However, the difference between the cover's opening and the base's length is small enough so that the cover can be tilted (as shown in FIG. 9B), such that the lip 84 may be pushed under the right edge of the base 24; the cover may then be moved to the right to a position where lip 82 will go under the opposite edge. When this has been accomplished, the lips 82, 84 will be respectively juxtaposed with, and positioned behind, opposite edges of the base; and a person will not be able to simply pull the cover 26 straight away from the base plate 24. The rear edges of the cover top and bottom also cover the edges of the generally planar base 24; so all edges of the base are not only shielded from view, they are also shielded against tampering, etc.

Referring still to FIG. 9A, those skilled in the art will recognize that the deliberate spacing between the base 24 and the front of the console 22 creates what may aptly be described as a pair of oppositely directed recesses 81, 83. Recess 81 opens to the left in FIG. 9A and is adapted to be subsequently engaged by the inwardly projecting lip or flange 84; recess 83 opens to the right and is adapted to be subsequently engaged by inwardly projecting lip or flange 82. These two recesses 81, 83 are adjacent the structural base and they remain exposed until they are filled with the inwardly projecting flanges or lips 82, 84 on the cover. So when the cover 26 is in its installed position (as in FIG. 5), the recesses 81, 83 will no longer be exposed.

But after the cover 26 has been positioned such that its lips 82, 84 are under the base 24, it would be advantageous to keep the cover centered with respect to the base, so that the locking device 70 can be easily placed in the aperture 34, etc. This is accomplished by placing a leaf spring 86 on the front of the base 24, in a position where its distal end will bear against the right side of the cover 26. The spring 86 will flex during installation of the cover and yield just enough to allow the lip 82 to be placed around the left edge of base 24. This deflection action is being represented in FIG. 9B. To provide space for this flexing of spring 86 and the sideward movement of lip 84, the lip 84 is made slightly wider than lip 82—by about one-quarter inch. When a manual force in the direction of arrow 88 (i.e., a force that is bending spring 86) is relaxed, the spring will push the cover 26 in a direction opposite to arrow 88; movement of the cover will be halted when the cover's left wall 90 comes into contact with the left edge of the base 24. This will leave all of the apertures associated with aperture 34 perfectly aligned and in a condition to accept a locking device 70. This "rest" condition is shown in FIG. 9C, and the terms "right" and "left" are used herein as they would be used by a driver who is facing an installed apparatus in his or her truck.

To remove the cover 26 from its static position adjacent base plate 24, a driver must first remove any locking device that may be in the aperture 34. Then the cover 26 is moved to the left (in the direction of arrow 88 in FIG. 9D), thereby compressing the spring 86. Before the spring 86 is fully compressed, left lip 82 will clear the left edge of base 24, such that the left part of cover 26 may be moved outwardly (in the direction of arrow 94). After the cover 26 has been moved in the direction of arrow 94 by an adequate amount, the other lip 84 may be moved slightly to the fight to completely free the cover 26 from any engagement with base 24.

It should perhaps be noted that the above-described "fail-safe" positioning of the cover 26 with respect to the base 24 is the preferred manner of positioning these relatively movable parts. And this is one reason that the base 24 is fixed just a short distance (slightly more than 0.090 inch) in front of the cosmetic structure 22. Otherwise, there would be no clearance space to slip a lip 82, 84 behind a base 24. But the concept of securely placing a cover 26 over a base 24 could still be employed to provide security for an air valve, even if the the refinements shown in FIGS. 9A through 9D are not utilized.

In FIG. 10 an alternate embodiment of the cover 26A is shown. In this embodiment the structural piece 32A does not extend for the full length of the cover; instead, the structural piece is shortened, bent "up" and welded to the "top" of the cover. The terms "up" and "top" refer to a direction and a relationship as they have so far been used in the several figures of the drawing; but this particular figure has been drawn upside down in order to better illustrate some of the internal features of the cover 26A. By shortening the structural piece 32A and welding it closer to where the locking device will later be inserted, it will be easier to maintain dimensional tolerances in a vertical direction. And there will be less likelihood of any interference between the lock's latch plate and the bottom of the structural piece 32A. Another difference in this embodiment is that the spring 86A is carried on the inside of the cover 26A instead of being mounted on the base. By mounting the spring 86A internally of the cover, it will be protected against getting caught on something. A small strap 96 may be welded on the inner wall of one of the cover's sides, in order to receive and hold the spring; and a small quantity of epoxy 98 may be used to secure the spring 86A in place.

Figure 11:
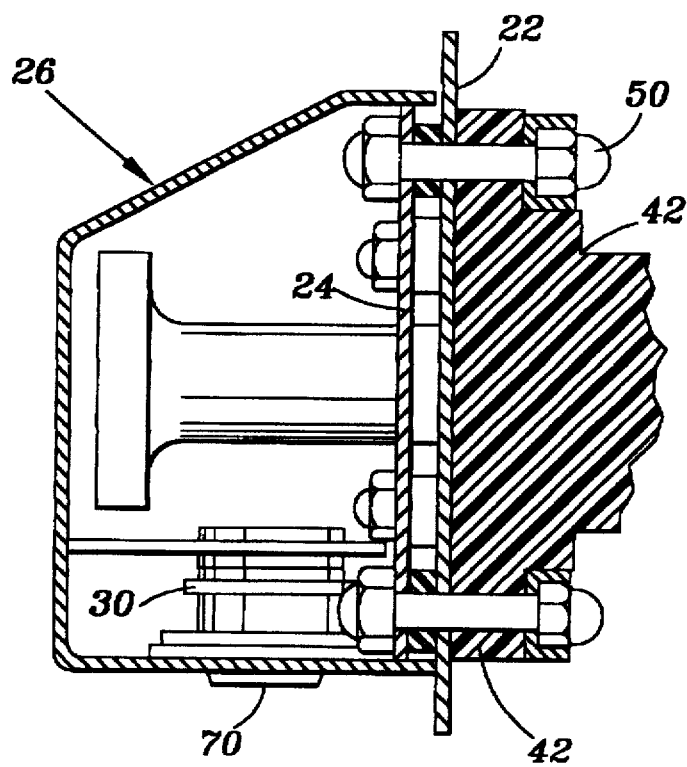
FIG. 11 shows an alternative manner of installing the major parts of the protective assembly, such that a key would be vertically inserted into a locking device from the bottom of the cover instead of its top.

Turning next to FIG. 11, it will be seen that the cover 26 can be installed on the dash board or other cab structure 22 so that a locking device and key will be insertable from the bottom instead of from the top. The base's hole pattern (clearly visible in FIG. 2) will permit the base 24 to be installed with the structural piece 30 either high or low—with respect to the rest of the base. So when the base 24 is installed on a truck so that the piece 30 is "high" (as shown in FIG. 2), the cover 26 will be oriented as shown in FIGS. 2 and 8. When the base 24 is installed so that the piece 30 is oriented "low," the cover will be oriented as shown in FIG. 11. It should also be noted that there is no part of the apparatus 20 whose operation is dependent on gravity. Hence, the apparatus 20 does not have to be suspended vertically; it could also be installed on a generally horizontal ledge or shelf, if the positioning of a truck's brake valve should so dictate. As long as there is enough clear space in front of a brake valve in which to reinforce or "harden" its front—and, of course, enough space to accommodate a lockable cover, then there is an opportunity to achieve the high degree of security that is possible with this design.

There are no known ways in which a properly secured cover 26 can be pried away from a suitably anchored base 24. But if someday a way is discovered to defeat the locking device or the cover 26, at least the presence of the apparatus 20 will likely have a deterrent effect on the potential theft of a tractor—especially if the tractor's engine is not left running. This is because a potential thief will be aware of the fact that it may take 6 or 7 minutes to break into the cab of a tractor, "hot wire" the ignition to start the tractor's engine, and wait for the compressor to build up enough air pressure to release the brakes. And anything like the presence of an apparatus 20, which could stretch that inherent 6 or 7 minute delay into several more minutes, will probably make a thief simply avoid that particular truck and look for an easier target. Perhaps it should be acknowledged that this speculation about diverting thieves is not based on any significant tests with the apparatus 20, because the apparatus has not been widely used. But persons who have admitted to being professional house burglars have told interviewers that they avoid any house that has an obvious impediment to a quick entry and exit, because they don't like to hang around a burglary site after they've made their decision to act on a perceived opportunity. So at least until most of the trucks, buses and tractor/trailer rigs that are presently on the road have a security system as described herein, it is believed that thieves will inevitably pass up a vehicle that is protected with a security system 20—rather than waste a lot of time trying to find some way to get the protective cover 26 off the instrument console, etc.

DETAILED DESCRIPTION OF A PREFERRED EMBODIMENT OF THE INVENTION

Figure 12:
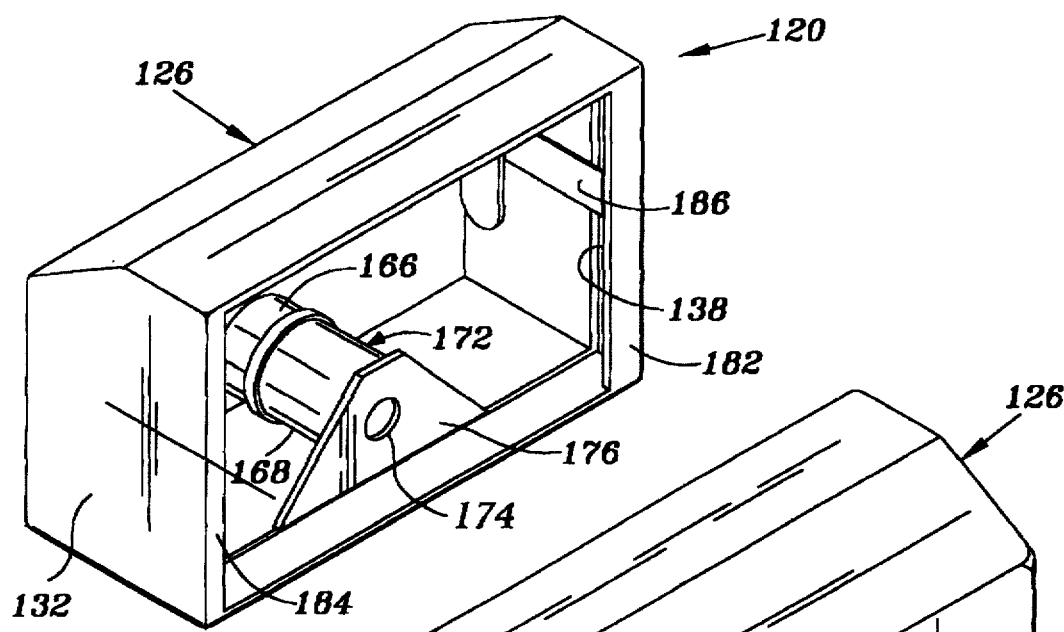
FIG. 12 is a perspective view of a rigid cover (taken from the rear) that constitutes a major part of an another embodiment of the invention—which is characterized by having a removable lock that can be inserted into and removed from the cover's front.
Figure 13:
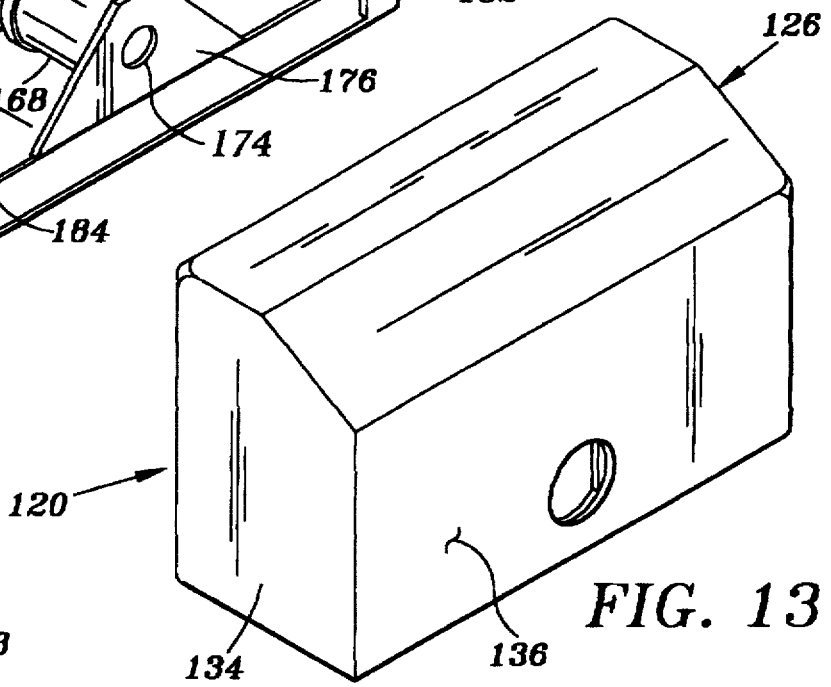
FIG. 13 is a perspective view of the same cover that is shown in FIG. 12, with this view showing the front of the cover.

Turning next to FIG. 12 and 13, another embodiment of the invention is shown—in which a keyed lock is inserted horizontally (instead of vertically) into the front of a hardened case. This embodiment, designated by the numeral 120, is considered to be the preferred embodiment because of two reasons. First, a rigid cover 126 is designed in such a way that a removable lock will be selectively inserted into the front of the cover, so there is no risk of spatial interference between the lock and any structure that may be around the brake-release knobs. Second, the protective cover 126 is made up of two box-like structures, one of which is slightly smaller than the other, so that the smaller can fit within the larger. This concept of placing a box within a box has major implications when a manufacturer is trying to heat treat or otherwise harden the cover in order to render it immune to potential destruction by a thief who wants to gain access to the control knobs that are inside the cover. These two features will be discussed more thoroughly in the description that follows.

Figure 14:
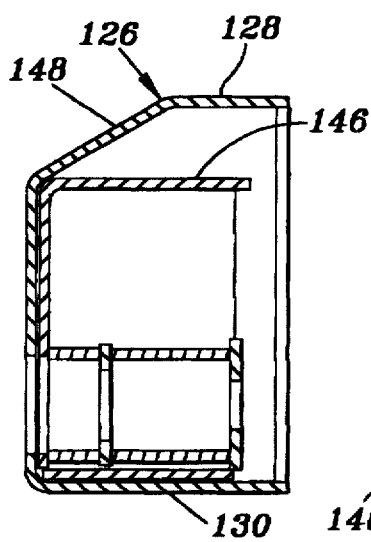
FIG. 14 is a cross-sectional view taken vertically through the cover shown in FIG. 12.
Figure 15:
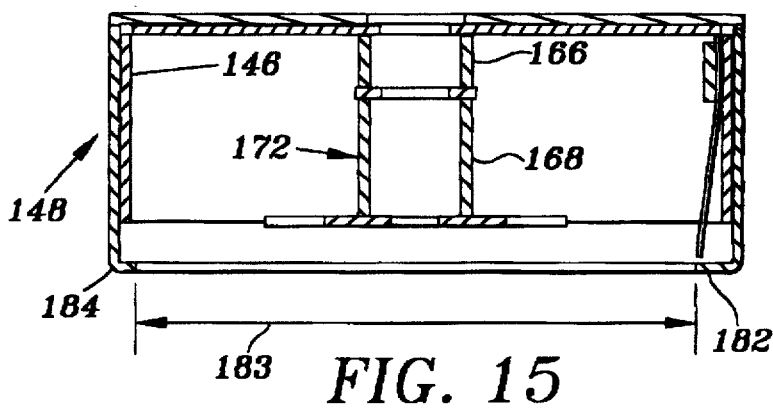
FIG. 15 is a cross-sectional view taken horizontally through the cover shown in FIG. 12.
Figure 16:
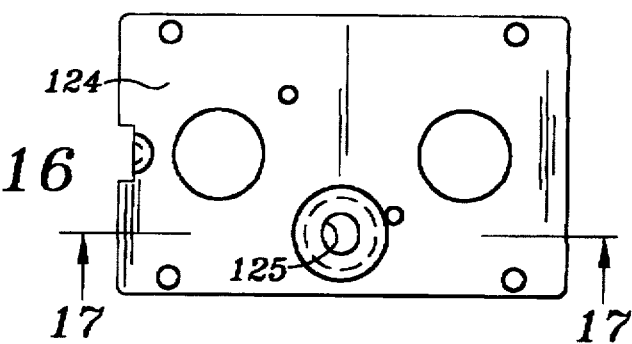
FIG. 16 is a front elevational view of a preferred structural plate that is affixed to the front of a typical brake valve housing—to provide a "harden" structure to which a rigid cover may subsequently be attached.
Figure 17:
FIG. 17 is a top edge view of the plate shown in FIG. 16, taken in the plane represented by lines 17—17 in FIG. 16.
Figure 18:
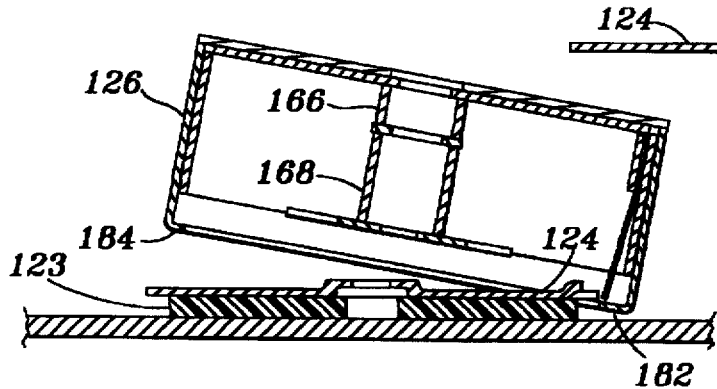
FIGS. 18–21 are successive cross-sectioned views, as seen from the top, of a cover being installed onto a static plate, with the arrows showing the prominent direction of movement of the cover, and numerous parts being omitted for clarity.
Figure 19:
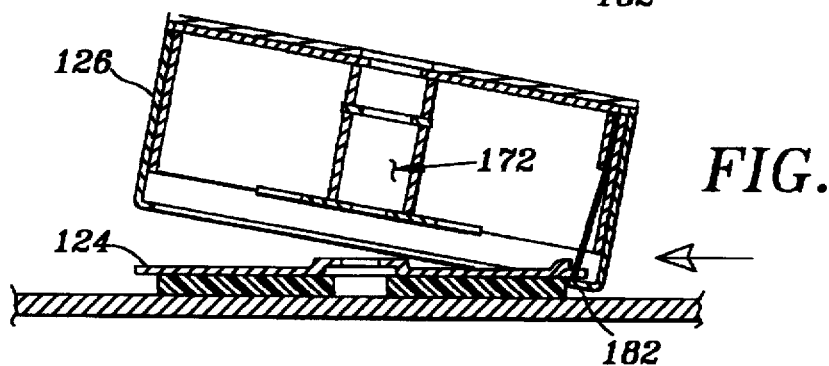
Figure 20:
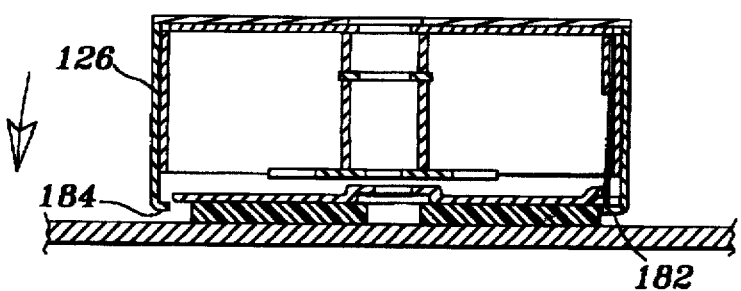

FIG. 12 is a perspective view of the front-locking embodiment 120 as seen from the rear, and FIG. 13 is a perspective view of the same apparatus as seen from the front. Referring additionally to FIGS. 14 and 15 (cross-sectional views taken through the cover 126 in vertical and horizontal planes, respectively), the cover has a top 128, a bottom 130, a right side wall 132 and a left side wall 134. As with the first embodiment, the vertical spacing between the top 128 and the bottom 130, as well as the horizontal spacing between the right side 132 and the left side 134 are such as to create a shell that can completely envelop the two knobs of a typical control valve for a vehicle's air brakes. For most tractors that are in use today, a suitable vertical spacing between the top 128 and the bottom 130 is about 3.5 inches, and a suitable horizontal spacing between the two side walls 132, 134 is a little over 5 inches. The apparatus 120 may also be described as having a protective cover whose front 136 is essentially closed, and a back 138 that is almost fully open. The opening in the cover's back 138 is sized to fit over a generally planar base plate 124 (shown completely in FIGS. 16 and 17). During installation of the security apparatus 120, the base plate 124 will be permanently affixed to the front of the air brake housing 142, using screws or bolts and the like. The base plate 124 therefore will constitute a static part of a three-part security apparatus 120, and the movable cover 126 and a locking means 170 will constitute the other two parts of the preferred embodiment.

Referring again to FIG. 15, it will be seen that cover back 138 is largely open, with two inwardly directed lips 182, 184 defining the plane that constitutes the back of the cover 126. As with the first-described embodiment, the horizontal distance between the interior edges of the two lips 182, 184 is important—not in an absolute sense, but rather in relation to the width of base plate 124. This lip-to-lip distance is represented by the double-headed arrow 183, and it should be slightly less than the width of the base plate; a size differential of at least ¼ inch is preferred. As an example, if the base plate 124 is 5.5 inches wide, the distance 183 should be about 5.25 inches wide. When the cover is installed, the two lips 182, 184 will overlie the outer edges of the base plate 124 by a total of about ¼ inch, which will be enough structural interference to defeat a thief, because this interference will preclude direct forward movement of a cover away from a fixed base plate 124. The latch plate on a lock, while present, is normally not relied on to resist longitudinal forces and thereby hold a cover onto a base plate; instead, the latch plate simple holds a lock in its blocking position inside a cover.

Figure 21:
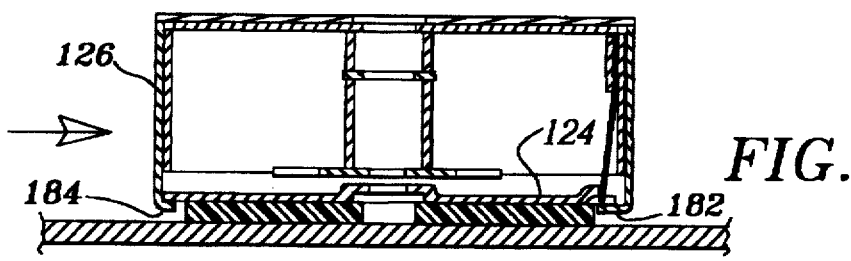

After the base plate 124 has been installed in a given vehicle, the cover 126 may be manually positioned over the base plate by temporarily deflecting a cantilevered leaf spring 186 with respect to the side wall 134 on which it is mounted. (A leaf spring is preferred because it will take up a minimum amount of space inside the cover, and it can be fabricated very economically.) This deflection of spring 186 will be similar to the action being represented with the first-described embodiment in FIG. 9B. The leaf spring 186 is deflected by manually placing the left edge of the base plate 124 into contact with the distal end of the spring and then moving the cover 126 to the right. Putting a plastic spacer 123 behind the base plate (as illustrated) helps provide an ample space into which the edges 182, 184 can be moved. Because the base plate 124 is fixed to the valve housing and cannot move, pushing on the cover causes the distal end of the spring 186 to be deflected—thereby storing potential energy in the spring. As soon as the cover 126 has been moved far enough to the right (about ¼ inch), the base plate 124 and the opening in the back of the cover will become aligned, and the left portion of the cover can be pushed backward toward the valve housing for a small distance (e.g., about ⅛ inch). In a short time the fixed base plate 124 will be completely enveloped by the back of the cover and hidden from view. When the manual force that is holding the cover to the right is relaxed, the energy that was stored in the spring 186 will be recovered; this will cause the cover to move slightly to the left, thereby causing both vertical edges of the base plate to be overlapped by essentially an equal amount of the cover's inwardly extending lips. This sequence of steps is illustrated in FIGS 18–21. The final rest position is illustrated in FIG. 21, wherein the rigid cover 126 is shown centered with respect to the fixed base plate 124.

Figure 23:
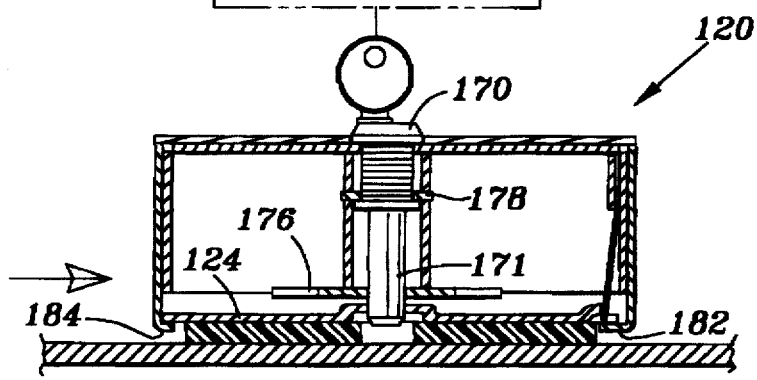
FIG. 23 is a cross-sectioned top view of a cover in its installed position over a static base, and indicating the possibility of using either one of two locks to secure the cover against relative movement with respect to a base.

The position of the cover 126 in FIG. 21 is a stable position but it is not a secure position. That is, the cover 126 is vertically supposed against the force of gravity by the upper edge of the base plate 124, so the cover will not fall downwardly if a driver removes his or her hands. The cover is precluded from unwanted shifting to the left by contact of the right edge of base plate 124 with the right side wall 134; and the cover is precluded from unwanted shifting to the right by tension in the stiff spring 186. So the cover 126 is truly stable as shown. But while it is stable, it can only be considered to be secure if there is some way to physically hold it in place so as to prevent a reversal of the procedure represented in FIGS. 18–21. To this end, there is provided a central chamber or tube 172 that is large enough to accept a lock 170, said chamber being clearly visible in several views beginning with FIG. 12. This chamber 172 is advantageously formed by welding small sections of tubular pipe inside the cover 126, at a location where the combined pipe sections 166,168 will be aligned with an aperture in the front of the cover. Coaxial with both the pipe sections 166, 168 and the front aperture is a rear guide that is created by providing an aperture 174 in a trapezoidal plate 176, said aperture having a diameter that is sized just slightly greater than the outer diameter of the barrel 171 of a lock 170 shown in FIG. 23. The lock 170 can be selectively inserted into the chamber 172 from the front of the cover 126 and will come to a fully seated position as shown in FIG. 23. The lock housing is prevented from rotating by the "double D" aperture at the front of the cover, one side of which is visible in FIG. 13. Inserting a key into the front of the lock and turning the key by, say, ninety degrees, will cause a latch to rotate ninety degrees behind lock plate 178, thereby precluding removal of the lock from the cover until a key is again used to rotate the latch in the opposite direction.

It will be seen that the forward end of a fully seated lock barrel 171 extends for an appreciable distance rearwardly of the trapezoidal plate 176. In fact, the barrel 171 is deliberately chosen to be long enough so that it will enter an aperture 125 in the fixed base plate 124; and the diameter of the aperture is established so as to provide a relatively close fit with the lock barrel—to preclude any unwanted side-to-side movement of the barrel. When the lock barrel 171 is precluded from side-to-side movement by the static base plate 124, and the lock barrel is structurally held inside the cover 126, then the cover will thereby be held against side-to-side movement with respect to the base plate. The net effect is to hold the cover 126 rigidly in place over the base plate 124, so that the brake release knobs are enveloped within a rigid shell and they cannot be pushed inwardly to release the vehicle's air brakes.

Figure 22:
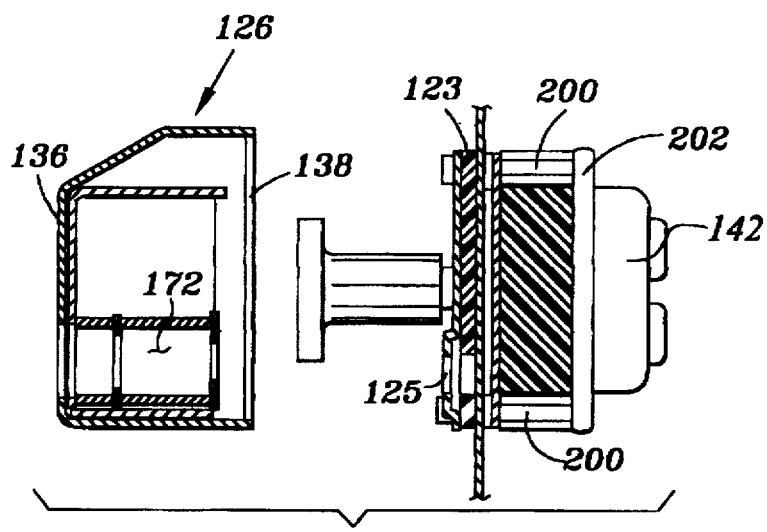
FIG. 22 is a cross-sectioned elevational view of the apparatus, and showing the relative position of a cover with respect to a brake valve just before the two are brought together.
Figure 24:
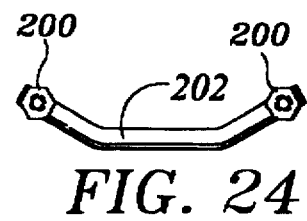
FIG. 24 is a bottom plan view of a fastening device that is advantageously used to connect a rigid base to the housing of a brake valve.
Figure 25:
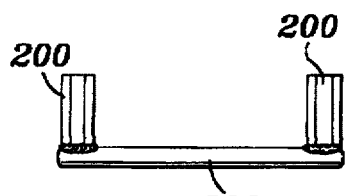
FIG. 25 is a side view of the fastening device shown in FIG. 24.
Figure 26:
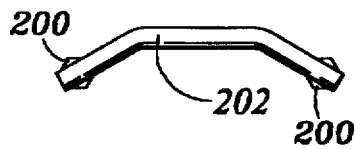
FIG. 26 is a top plan view of the fastening device shown in FIG. 24.

The apparatus that has been described to this point is fully capable of securing a brake release valve against ordinary tampering or unauthorized use. But it must also be recognized that there may be thieves in the world who would love to steal a trailer containing computers or other merchandise that may be worth hundreds of thousands of dollars, and they may be very resourceful in their efforts. Common tools that are available to theives may include drills, saws, hammers, bolt cutters, crow bars, cutting torches, files, etc. And if there is a possible "soft spot" in the apparatus that has been described, it is that a thief might try to drill through the front of the cover 126 and insert a dowel or drift pin with which to push against a brake release knob. To perfect the security of brake release knobs inside a cover 126, the cover should be rendered immune to traditional tampering techniques—including drilling. To "harden" a cover against drilling or other tampering, it might be possible to find some exotic—and very expensive material—from which to manufacture the cover. However, to keep manufacturing costs to a minimum, an alternative technique is utilized. In the embodiment shown in FIGS. 12–26, "hardening" is accomplished by constructing the cover 126 as two box-like elements, with one being smaller than the other, and the smaller being rigidly held within the larger—by welding or the like. The inner box 146 is large enough to envelop both knobs of a conventional brake valve (as indicated by FIG. 22), so that there will be no way to go around the box in order to push on either a knob or its associated valve stem. This inner box 146 is advantageously made of 4130 tool steel or any comparable high alloy steel, and it goes through a carbo-nitriding process during heat treat to give it a substantial hardness (e.g., Rockwell C56 or greater). And if a thief should try to drill through the front of the box 146, there would be nothing but broken and burned drill bits on the floor of a tractor's cab.

A potential disadvantage of heat treating the inner box 146 in order to thrwart drilling is that the heat treated box will then have a tendency to be somewhat brittle. It is conceivable, there, fore, that a thief could bring along a sledge hammer and use it to beat on the exterior of the box 146 with sufficient force as to crack the hard surface of the box. To protect the box 146 from blows that might contribute to structural failure, a larger box 148 is rigidly secured around the small box—by welding or the like. The larger box 148 is preferably made of a material like 1018 mild steel; and it is secured to the small box 146 before the small box is heat treated. Of course, the large box 148 will be exposed to carbo-nitriding at the same time that the small box is heat treated, and it will have a similar hardness on its surfaces; but the carbo-nitriding will not penetrate through to the core of the mild steel. So, the large box 148 will have a relatively ductile core interiorily of its hard outer surfaces, and it will be able to absorb a great deal of abuse from hammers or other impact devices. Indeed, the soft-steel outer box 148 may even be thought of as a "cushion" around the completely hard inner box 146, so that the inner box might be isolated from forces that might harm it. So if a thief should bring along a drill and try to go through the front of a cover 126, the most that could be accomplished might be to drill through the outer box 148. As soon as the tip of the drill reached the hard inner box, the drill would be ruined. And if the thief was sufficiently knowledgable about metallurgy to recognize that there must be more to the cover 126 than just an ordinary metal shell, there would be no way to get at the hard inner box 146 in order to work on it. Further protection against malicious hammer blows or attempts to cut the inner box with an acetylene torch can be realized by providing a gap of a few thousandths of an inch (e.g., about 0.005 to 0.025 inch) between the inner and outer boxes 146, 148. Faced with the difficulty of gaining access to the control knobs, it is presumed that an ordinary thief would give up and move on to some unprotected truck or tractor; and the apparatus 120 would have done what was expected of it—to preclude the unauthorized movement of a vehicle with air brakes.

Extra protection against tampering can be achieved by providing structural elements behind the valve housing. A pair of coupling nuts 200 have a bar 202 welded to their rear ends, to preclude turning of the nuts as screws are threaded into the nuts from the front of the housing. An illustrative embodiment of a structural element is shown FIGS. 24–26.

While the preferred embodiment of the invention and certain alternative embodiments have been disclosed herein in great detail, it should be apparent to those skilled in the art that modifications to some of the structural details could be made without departing from the basic concept that has been disclosed. For example, instead of sizing the edges of the cover 26 so that they fold around (and conceal) the edges of the base 24, it would be feasible to design an arrangement that could be aptly described as a tongue-and-groove mating of the two parts. Also, a different locking device could be chosen, and the cover modified to accept a different lock, etc. Too, the preferred lock could be permanently attached to the cover, so that the two are removable from a base plate as a unit—instead of having the lock separable from the cover. Also, the steps of installing and removing a cover have been described as primarily involving horizontal movements; and security for the control knobs that are captured inside a cover has been achieved by inserting a locking device to preclude horizontal movement. But it is conceivable that a cover might someday be desirable that is primarily installed and removed with vertical movements; security would then be achieved by precluding the subsequent vertical movement of a cover that has already been installed. Also, it is contemplated that this invention may find its greatest value to society as an "aftermarket" item that is installed on the hundreds of thousands of trucks and the like that are already on the road. To this end, the invention has been designed to mate with the housings of traditional brake valves, using existing hole patterns, etc. But the invention may also have substantial value to those who would want to incorporate its teachings into brake systems on vehicles that are currently being designed. If this were the case, it might even be possible to design a structural base that is not as thin and flat as the generally planar member shown in, say, FIG. 17. Because of these and other considerations that may be apparent to those skilled in the art, it should be understood that the breadth and scope of the invention should be measured only by the claims which are appended hereto.

What is claimed is:

1. An apparatus adapted to prevent the theft of a wheeled vehicle, comprising:

a) a wheeled vehicle having a cab in which a driver sits to operate the vehicle, and the vehicle having parking brakes that are controlled by pressurized air, and there being a manually actuated valve that the driver uses to control at least one set of the vehicle's brakes, said valve being of the push/pull type that is selectively actuated by linear movement of an exposed knob that is located adjacent a supporting structure in the cab, and the valve having a housing which is mounted behind the supporting structure in a position where it is not normally visible to nor accessible by the driver;

b) a structural base permanently installed in an exposed position in the vehicle's cab where the base will be normally accessible to the driver, and said base being rigidly connected to the valve's housing with a plurality of metal fasteners, and said base being rigid and being configured for installation between the valve's housing and the valve's knob, and said base being configured in such a way that it will not interfere with normal push/pull movement of the valve's knob when the base has been installed, and there being a pair of oppositely directed recesses adjacent the base that are exposed when the structural base has been connected to the valve's housing;

c) a rigid and generally hollow cover adapted to be selectively suspended over and in contact with the structural base after the base has been installed in the vehicle's cab, and the cover being sufficiently deep as to envelop the knob of said manually actuated valve in order to conceal the knob and render it inaccessible when the cover is suspended over the structural base, and the cover being selectively removable from the structural base so as to permit the driver to remove the cover and thereby have access to the knob in order that the valve may be actuated with a normal push/pull motion of the knob, and the cover also enveloping any exposed parts of the plurality of metal fasteners when the cover is suspended over the structural base, and the cover having two sides with inwardly directed flanges that are sized and located to engage the pair of oppositely directed recesses that are adjacent the base when the cover is suspended over the base, such that there being structural interference between the cover and the structural base in a direction that is perpendicular to the structural base when the inwardly directed flanges on the cover are engaged with the oppositely directed recesses; and d) locking means for selectively locking the rigid cover in its suspended position over the structural base, said means including a locking device, and the valve's knob being secured against tampering by unauthorized personnel when the cover has been suspended over the base and locked with the locking device, and the plurality of metal fasteners also being secured against tampering by unauthorized personnel when the cover has been suspended over the base and locked with the locking device.

2. The apparatus as claimed in claim 1, wherein the locking device is a key-operated device that is selectively removable from the rigid cover by any person having custody of an appropriate key, and the key-operated device being selectively removable by an authorized person within the vehicle's cab, whereby the security of the key-operated device may be enhanced by selectively removing it from an unattended vehicle cab when it is not being used to deter theft.

3. The apparatus as claimed in claim 1 wherein the rigid cover is suspended with respect to the structural base and selectively removed from the structural base by side-to-side movements, and wherein the locking means includes a rigid post that mates with the structural base and precludes side-to-side movements of the rigid cover with respect to the structural base.

4. The apparatus as claimed in claim 3 wherein the rigid post is inserted into and removed from a mating position with the structural base by moving said post inside the vehicle's cab and in a direction that is parallel to the direction of normal knob movement, whereby routine movement of the post will be as free and unobstructed as routine movement of the brake knob, and whereby routine movement of the post will not be impeded by any vehicle components that are adjacent the brake knob and mounted on the supporting structure in the cab.

5. The apparatus as claimed in claim 1 wherein the locking device has both a locked condition and an unlocked condition, and the locking device constitutes a key-operated mechanism that is removable from both the structural base and the cover when the locking device is in its unlocked condition.

6. The apparatus as claimed in claim 1 wherein the rigid cover is formed from first and second metal boxes, and the first box is smaller than the second box, and the first box is rigidly fixed inside the second box, and wherein the first and second boxes are made of different materials and said different materials have different hardness characteristics.

7. The apparatus as claimed in claim 6 wherein the first box is made of 4130 tool steel and second box is made of mild steel, and both boxes have been subjected to carbo-nitriding heat treatment, whereby a thief will be precluded from drilling through the two boxes in order to attempt the theft of a vehicle whose brakes have been applied, and said attempted theft involving the act of gaining access to the inside of the cover and pushing a brake knob toward the valve housing.

8. The apparatus as claimed in claim 1 wherein the locking means includes a plurality of alternative locking devices, each of which has a substantially identical external configuration, and each of the alternative locking devices is releasable with a unique key, whereby more than one person may have a personal and unique key for releasing a respective one of the locking devices, and whereby movement of a secured vehicle may be precluded until the key that fits a particular locking device has been used to release the particular locking device that is preventing removal of the rigid cover in the secured vehicle.

9. The apparatus as claimed in claim 1 wherein the valve housing has a plurality of factory-prepared holes for receiving certain fasteners for the sole purpose of mounting the valve housing onto a supporting structure in a vehicle's cab, and wherein the factory-prepared holes for receiving mounting fasteners are arranged in a given hole pattern, and wherein the structural base has a plurality of prepared holes that are arranged in a pattern that matches the hole pattern of the factory-prepared holes in the valve housing, whereby there is no necessity to drill new holes into the valve housing in order to provide holes that can be used to connect the structural base to the valve housing.

10. The apparatus as claimed in claim 1 wherein structural base has a generally planar configuration, and wherein the rigid cover is held in its suspended position over the structural base by use of a resilient member that continuously biases the cover to a position in which there is structural interference between the cover and the structural base in a direction that is perpendicular to the structural base, and wherein the resilient member is a spring that is mounted inside the cover so as to movable therewith.

11. The apparatus as claimed in claim 1 wherein the wheeled vehicle is a tractor that is designed to pull a large trailer on a highway, and there are air brakes on the vehicle for securing both the tractor and the trailer in a parked condition, and wherein there are two longitudinal shafts that are connected to a brake valve housing that is concealed behind the supporting structure, and wherein the structural base has two spaced apertures which are sized and located to surround and provide clearance with respect to said two longitudinal shafts.

12. An apparatus comprising:

a) a wheeled vehicle having a cab in which a driver sits to operate the vehicle, said vehicle being of the type that uses air pressure to control the vehicle's brakes, and there being at least one manually actuated air valve that sets and releases the vehicle's brakes when the vehicle is parked, said air valve having a housing that is normally located adjacent the cab but exteriorly of a support structure so that the valve housing is out of sight and normally inaccessible by the driver, and said valve having a push/pull knob that is located within the cab near the driver and adjacent the supporting structure, and the knob being openly exposed so that it may be readily manipulated by the driver to set and release the vehicle's brakes;

b) a generally planar and rigid base permanently attached to the valve housing at an exposed location within the cab and adjacent the supporting structure, and there being a pair of oppositely directed recesses adjacent the base that are exposed when the base has been attached to the valve's housing, said base being configured and the attachment location being one where the valve knob remains unobstructed when the base is attached to the valve housing, whereby the presence of the base will not affect manipulation of the valve knob by the driver in order to control operation of the air valve;

c) a rigid cover adapted to be selectively placed within the cab in a resting position adjacent the base, and the cover having two inwardly directed flanges that are sized and located to engage the pair of oppositely directed recesses adjacent the base when the cover has been placed in its resting position adjacent the base, such that there will be structural interference between the cover and the base in a direction that is perpendicular to the base when the inwardly directed flanges on the cover are engaged with the oppositely directed recesses, and the cover having a size and shape so as to render the valve knob and the base inaccessible when the cover has been placed in its resting position, whereby the valve knob cannot be manipulated by anyone when the cover is in its resting position, and whereby a thief cannot get access to the base in order to try to remove it when the cover is in its resting position; and d) locking means for rigidly holding the rigid cover in its resting position adjacent the base, whereby a driver of the vehicle may render the vehicle immovable by manipulating the valve knob in a normal manner to secure the brakes, and whereby the driver may then render the knob inaccessible by placing the rigid cover in its resting position, and whereby the rigid cover may be locked in its resting position so as to render the vehicle immovable until such time as the cover has been removed and the brakes have been released.

13. The apparatus as claimed in claim 12 wherein the valve's housing has a plurality of threaded bores for mating with fasteners to hold the valve housing adjacent the support structure in the vehicle's cab, and wherein the threaded bores are arranged in a certain hole pattern, and further including a hole pattern in the generally planar base that matches the hole pattern in the valve's housing, such that the valve's housing does not have to be modified in order to permit the rigid base to be attached thereto as an aftermarket item.

14. The apparatus as claimed in claim 12 wherein the generally planar base consists primarily of a rigid member having right, left, top and bottom edges, and wherein the cover is configured so as to envelop all of the rigid member's edges when the cover is placed in its resting position adjacent the base, whereby the possibility of someone successfully tampering with the apparatus is minimized because the base is effectively concealed from view when the cover is in its resting position.

15. The apparatus as claimed in claim 12 wherein the locking means is almost completely concealed interiorly of the cover when the cover is secured in its resting position over the generally planar base.

16. The method of securing protection against unauthorized movement of a wheeled vehicle that uses pressurized air to effect braking, said vehicle having a cab in which a driver sits, and the protection against unauthorized movement being accomplished by denying access to the control knob of a manually operable air valve in the vehicle's cab, and the air valve having a brake housing with a back that is connected to the vehicle's brake system, and the brake housing having a front through which a valve-operating shaft extends, and the control knob being mounted on the distal end of said shaft, and the shaft normally being longitudinally movable by a driver in a push/pull manner in order to set and release the brakes on the vehicle, comprising the steps of:

a) permanently attaching a structural plate to the valve's housing in a way that the structural plate does not touch the control knob, and at least a major portion of said structural plate being spatially positioned inside the vehicle's cab and between the front of the valve's housing and the control knob;

b) setting the vehicle's brakes to preclude movement of the vehicle by pulling outwardly on the control knob;

c) selectively attaching a rigid cover to the structural plate and over the control knob such that the cover does not touch either the control knob or the valve-operating shaft, and the cover having a generally cavernous shape and being sufficiently large as to completely envelop and thereby isolate the control knob and the valve-operating shaft when the cover has been attached to the structural plate, whereby the control knob cannot be used to manually release the air brakes when the cover is attached to the structural plate; and d) selectively locking the rigid cover in its attached position over the control knob, whereby the vehicle will be rendered immovable for as long as the cover is attached to the structural plate and the knob cannot be reached for the purpose of releasing the vehicle's brakes.

17. The method as claimed in claim 16 wherein the structural plate is permanently attached to the valve's housing using a plurality of fasteners and complementary threaded bores in the valve's housing, and wherein said threaded bores are normally provided as an integral part of the valve's housing as it is manufactured, and said threaded bores are normally used for mounting the valve's housing onto the support structure in a vehicle's cab, and including the step of engaging the threaded bores with fasteners to simultaneously mount the valve housing on a support structure and attach the structural plate to the valve housing.

18. The method as claimed in claim 16 and including the further step of locking the cover over the valve knob by inserting a portable locking device into an aperture in the structural plate, and the aperture being located so that it is accessible from inside the cab and the cover is precluded from moving with respect to the structural plate when the locking device is in said aperture.

19. The method as claimed in claim 18 wherein the locking device that is inserted into an aperture is a key-operated mechanism, and including the step of inserting a given one of at least two differently keyed mechanisms into the aperture, whereby the cover may be locked in place over the control knob by a selected one of at least two key-operated mechanisms, and whereby different persons may have their own personalized keys for their respective mechanisms without compromising the security of another person's key.

20. The method as claimed in claim 16 and including the further step of rendering the cover immune to tampering by fabricating the cover from two separate and distinct metals that are placed one over the other and rigidly connected, and wherein the interior one of the two metals is characterized by having excellent resistance to being drilled but having relatively less resistance to impact forces, and the outer metal is characterized by having excellent resistance against impact forces, whereby the outer metal compensates for any deficiency that the inner metal might exhibit in resisting impact blows by a potential thief.

21. The method as claimed in claim 20 and including the step of initially welding the outer metal to the inner metal, and subsequently heat treating the two metals as a unit, and wherein the chemical compositions of the two metals are sufficiently different that the results of their common heat treatment will be different.

22. The method of precluding the unauthorized movement of a parked vehicle that utilizes air brakes, said vehicle having a cab in which a driver sits to operate the vehicle, and wherein the brakes for said vehicle include a valve with a housing and a valve-operating shaft and a push/pull knob that protrudes from the front of the valve housing, and the valve being installed behind a supporting structure in the vehicle's cab, and the knob being located in front of the supporting structure where it may normally be manipulated by a driver in order to move the shaft and alternately set and release the vehicle's brakes, comprising the steps of:

a) rigidly securing a structural plate to the outside of the valve housing at a location such that the plate will be in front of the supporting structure in the vehicle's cab and immediately behind the push/pull knob, whereby the structural plate is physically secured to the valve housing without contacting the push/pull knob;

b) selectively suspending over the structural plate a rigid and hollow cover that is sufficiently deep as to envelop the push/pull knob and render it inaccessible, such that a person is unable to manipulate the push/pull knob for as long as the cover is suspended over the plate, and the cover being sufficiently large, so that it will not contact either the push/pull knob or the valve-operating shaft on which the knob is mounted; and c) selectively locking the cover in place after it has been suspended over the structural plate, such that a person who is unable to remove the cover will also be unable to manipulate the push/pull knob, and whereby a vehicle's brakes may be set by manipulation of the knob and the vehicle will be incapable of being moved until the knob has again been manipulated and the brakes have been released.

23. The method as claimed in claim 22 wherein the cover is locked in place over the structural plate by inserting an independent locking device that prevents relative movement between the cover and the structural plate, and the independent locking device being manually separable from both the structural plate and the cover, and including the further step of separating the independent locking device from both the cover and the structural plate and storing it in a secure location when it is not performing its function of locking the cover in place.

* * * * *